United States Patent [19]

Fitzgerald et al.

[11] 4,018,384
[45] Apr. 19, 1977

[54] FLOW ATTACHMENT DEVICE FOR THRUST VECTOR CONTROL

[75] Inventors: Robert Edward Fitzgerald, Wethersfield; Robert Frederick Kampe, West Hartford, both of Conn.

[73] Assignee: Chandler Evans Inc., West Hartford, Conn.

[22] Filed: Feb. 13, 1976

[21] Appl. No.: 657,751

[52] U.S. Cl. .......................................... 239/265.19
[51] Int. Cl.$^2$ ........................................ B63H 11/10
[58] Field of Search ................ 239/265.17, 265.19, 239/265.23; 60/230, 231

[56] References Cited

UNITED STATES PATENTS

| | | | |
|---|---|---|---|
| 2,702,986 | 3/1955 | Kadosch et al. ............. | 239/265.19 |
| 3,463,417 | 8/1969 | Cruz .................................. | 244/23 |
| 3,606,165 | 11/1969 | Dunaway ...................... | 239/265.17 |
| 3,697,020 | 10/1972 | Thompson ......................... | 244/12 |
| 3,806,063 | 4/1974 | Fitzgerald ................. | 239/265.19 X |

FOREIGN PATENTS OR APPLICATIONS 654,344 6/1951 United Kingdom .......... 239/265.17

Primary Examiner—John J. Love
Attorney, Agent, or Firm—Radford W. Luther; Richard A. Dornon

[57] ABSTRACT

An exhaust nozzle has two frames each with flow attachment surfaces, mounted on its exit end in diametrically opposed relationship. Side plates are mounted on the sides of the attachment surfaces in such a manner that the plates project inwardly toward the axis of the nozzle. The attachment surfaces and their respective side plates define flow channels which receive only annular sectors of the exhaust stream emanating from the nozzle. Each flow channel is of sufficient radial depth and curvature to permit ambient pressure at a selected location on the attachment surface to detach the exhaust stream. A plurality of passages are provided in each frame for communicating ambient pressure to the respective attachment surfaces. A solenoid operated valve on each frame controls communication between the respective passages and the ambient atmosphere. A pulse ratio modulator circuit, responsive to a command signal, applies pulses to the valves such that an annular sector of flow may be successively attached and detached to generate a lateral force having a duration corresponding to the magnitude of the command signal.

6 Claims, 14 Drawing Figures

LONGITUDINAL AXIS OF NOZZLE

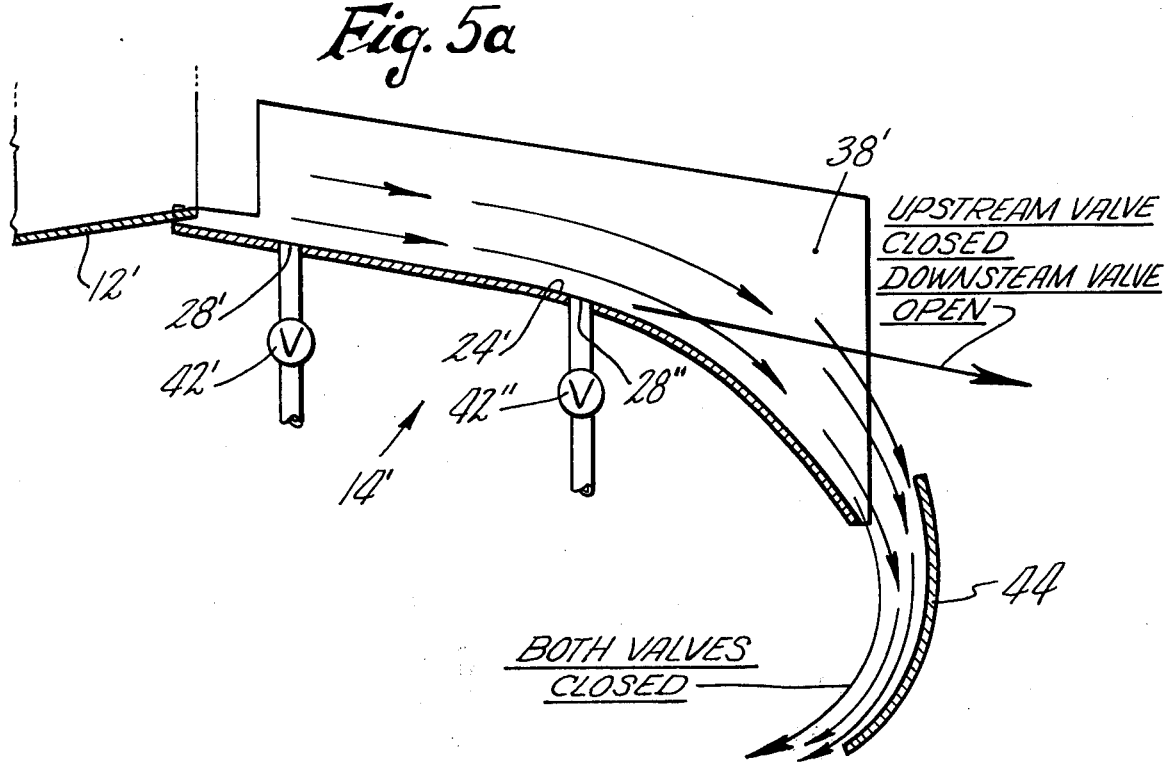
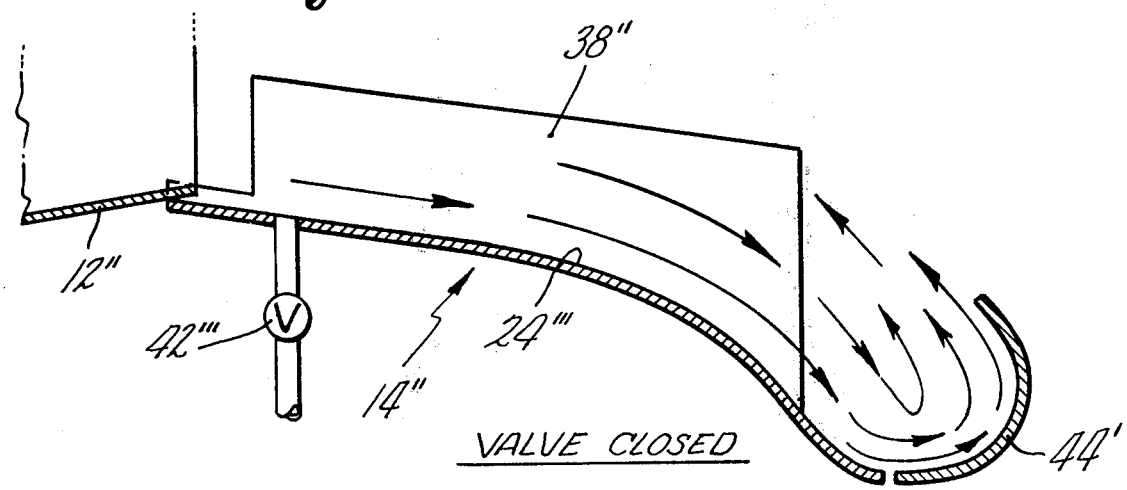

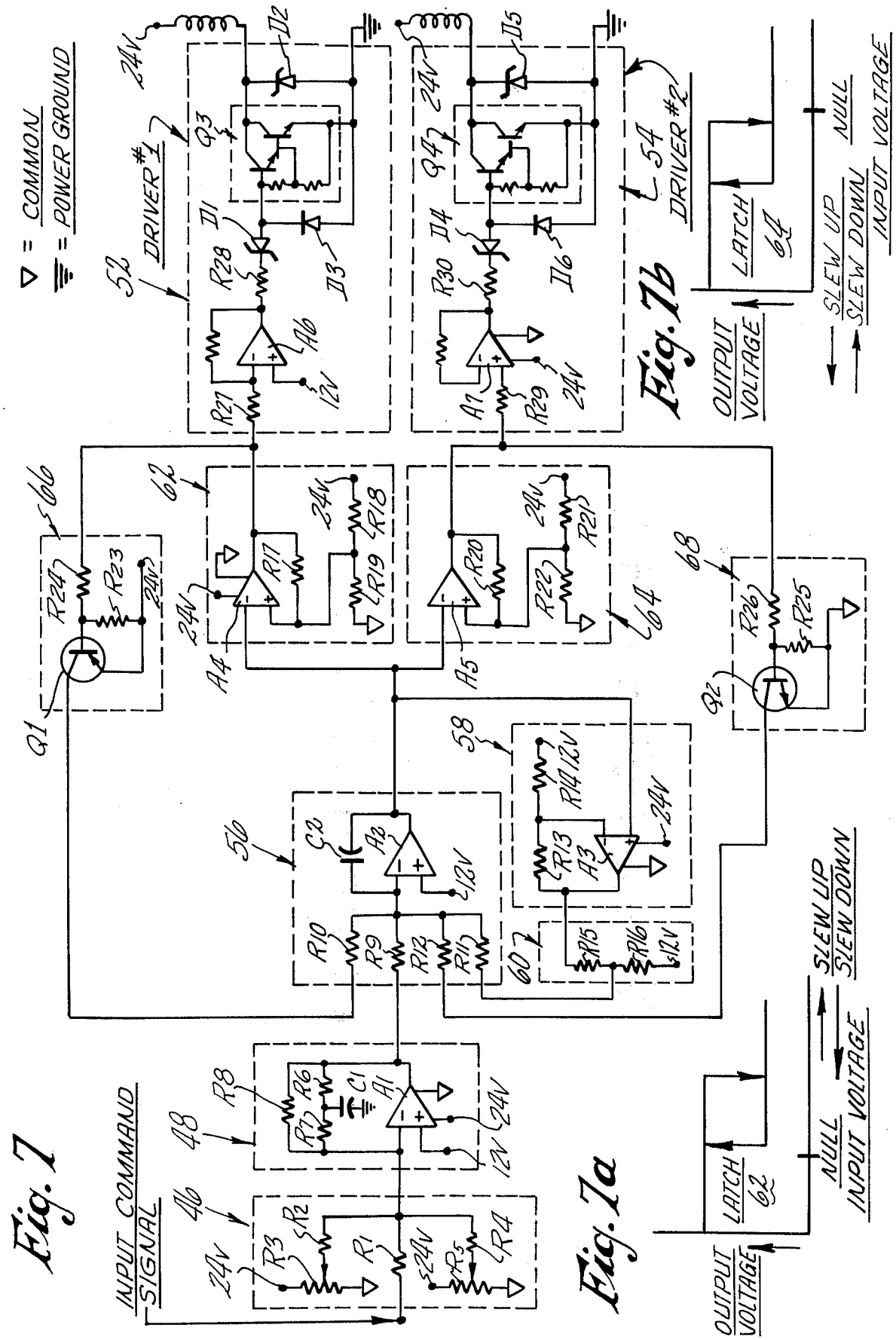

FLOW ATTACHMENT DEVICE FOR THRUST VECTOR CONTROL

BACKGROUND OF THE INVENTION

This invention relates to thrust vector control systems and more particularly to vehicle control systems which utilize attachment surfaces to deflect flow for applying a control force to the vehicle.

In the past, flow exiting a nozzle has been deflected for thrust vector control purposes by a number of devices. For example, air or secondary fluid has been injected into the exhaust stream to deflect the entire stream. Also, nozzles have been mounted for movement to direct the thrust vector. In addition, exhaust streams have been directed over Coanda attachment surfaces such as jet flaps. Generally speaking, the above devices function to deflect the entire exhaust stream.

It is also possible to obtain thrust vector control by placing a movable vane or deflector in the exhaust stream, whereby only a portion of the exhaust stream is deflected.

Although the above mentioned devices are fully capable of directing thrust vectors so as to produce the desired control forces, there are nevertheless certain disadvantages associated therewith. An obvious drawback related to the injection of fluid into the exhaust stream is that either ports must be provided in the nozzle or conduits are necessary to carry flow to the exit plane thereof. In specific applications, it may not be feasible to furnish such ports or conduits, due to weight, cost or structural factors. It should be evident that systems employing movable nozzles are both costly and structurally complicated.

In situations where deflection of an entire stream is not desirable, neither prior art Coanda surface, fluid injection, nor movable nozzle arrangements would be appropriate. Where a movable vane could furnish the required control force, drag, weight, cost and structural considerations could render it unsuitable for the selected application, particularly where hot exhaust gases are concerned.

SUMMARY OF THE INVENTION

The invention provides a thrust vector control system which incorporates an attachment surface positioned at the exhaust end of a nozzle so as to generally form a partial extension of the wall thereof. Side plates are attached to the sides of the attachment surface for defining a flow channel adapted to receive an annular sector of the exhaust stream. For a given exhaust velocity, the curvature of the attachment surface and the radial thickness of the annular sector are generally determinative of the streams bistable properties, that is, whether the stream can be readily attached and detached. Passage means are provided to establish and terminate communication of ambient air pressure to the attachment surface, whereby an attached stream may respectively detach therefrom and attach thereto. Accordingly, the invention is believed unique in that it allows for switching of only a portion of an exhaust stream emanating from a nozzle by a fixed attachment surface.

A thrust vector control system of the invention offers a number of advantages. Prominent among such advantages is the fact that no moving parts are necessary, save for the valving required to direct ambient air to the attachment surface; and it will be appreciated that the valving may be positioned, remote from a hot exhaust stream, in contact with ambient air at low pressure. Another benefit which is derivable from the invention is the minimal drag force engendered when the flow is detached, which results from having only the side plates in the exhaust stream. By providing a plurality of locations for ambient air communication along the length of the attachment surface it is also possible to obtain variable deflection angles, one of which could constitute a thrust reversal angle if an additional flow turning surface is furnished.

A flow attachment device of the invention is particularly well-suited to being employed for guidance of a flight vehicle having a jet engine. For example, two such devices could be oppositely mounted adjacent the tailpipe of the engine to provide for pitch or yaw control. This would eliminate the need for ports in the tailpipe wall or secondary injection structure.

Therefore, it is a primary object of the invention to provide a thrust vector control device associated with a nozzle which permits switching of only a portion of the exhaust stream emanating from the nozzle.

Another object is to provide a thrust vector control device having an attachment surface adapted to be mounted on or made integral with the exhaust end of a nozzle.

Still another object is to provide a thrust vector control device which offers minimal drag and is structurally uncomplicated.

A further object is to provide a thrust vector control device capable of deflecting flow from an exhaust nozzle through various deflection angles.

These and other objects and advantages of the invention will become more readily apparent from the following detailed description, when taken in conjunction with the accompanying drawings, in which:

BRIEF DESCRIPTION OF THE DRAWINGS

FIG. 5a is a schematic view of another embodiment of the invention which is adapted to produce two variable deflection angles for steering and thrust reversal purposes, respectively.

FIG. 5b is a schematic view of yet another embodiment of the invention which is adapted to produce a reverse thrust component.

FIG. 7 is a schematic view of a preferred circuit for controlling the valves in accordance with the block diagram of FIG. 6.

FIGS. 7a and 7b are graphs showing the functioning of the Latches of FIG. 7.

DETAILED DESCRIPTION OF PREFERRED EMBODIMENTS

Figure 1:
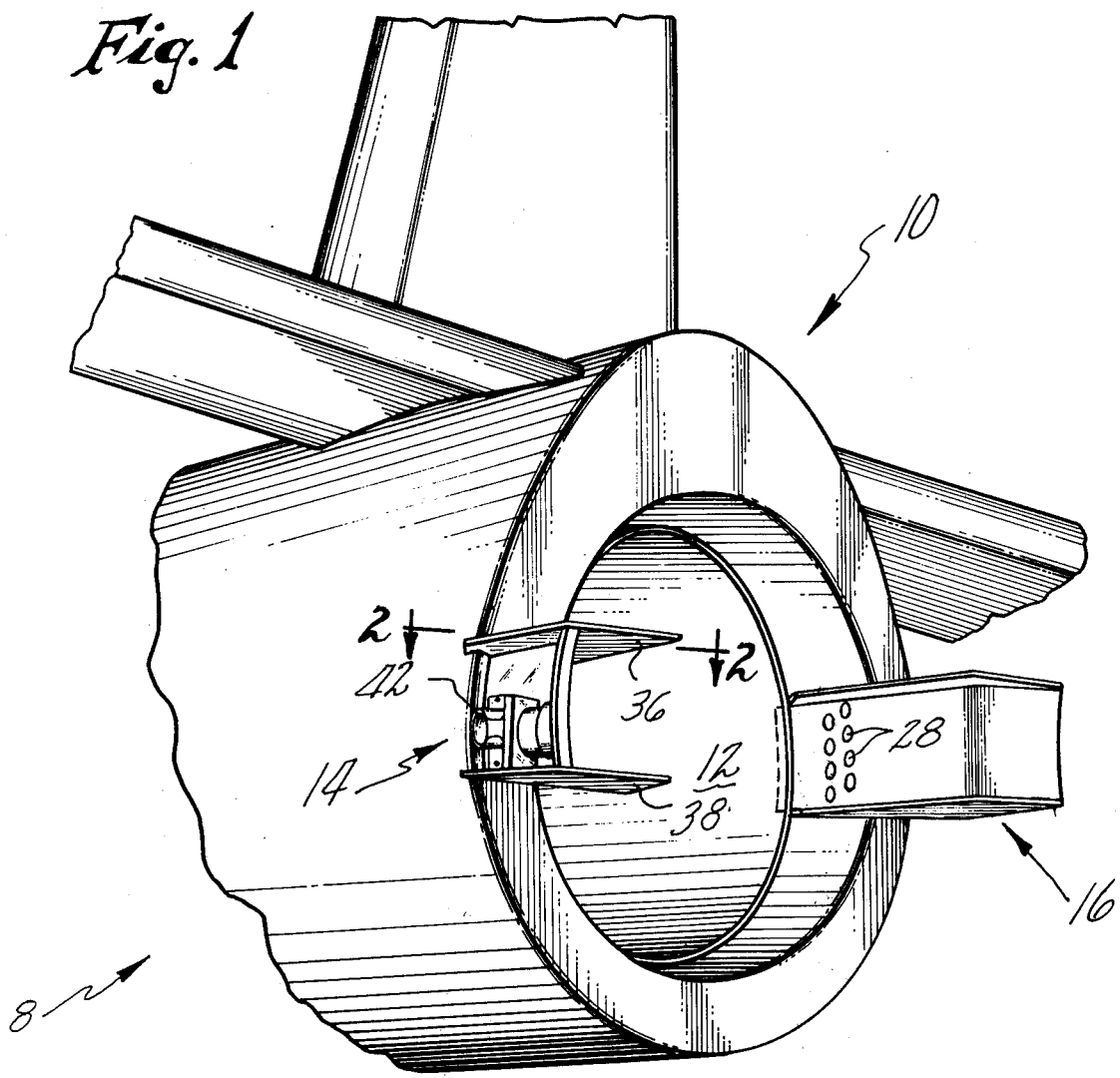
FIG. 1 is a perspective view of the exhaust end of a flight vehicle which incorporates a pair of thrust control devices of the invention for controlling yaw.

Referring to FIG. 1, there is shown the rear end of a flight vehicle 8 having a thrust vector control system 10 according to the invention. The flight vehicle 8 comprises a fuselage 10 in which is mounted a tailpipe 12 and a jet engine (not shown). The tailpipe 12 generally defines an exhaust nozzle which directs an exhaust stream rearwardly along its longitudinal axis. Two identical flow attachment devices, generally indicated at 14 and 16, are mounted on the end of the fuselage in a diametrically opposed relationship for deflecting respective portions of the exhaust stream in order to control yaw.

Figure 1A:
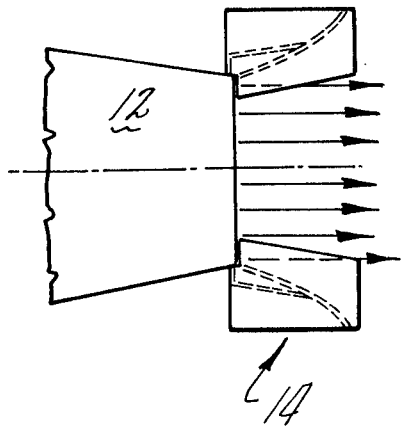
FIGS. 1a, 1b and 1c are schematic plan views showing an undeflected exhaust stream, the exhaust stream partially deflected to produce a lateral yaw control force in one direction, and the exhaust stream partially deflected to produce a lateral yaw control force in the opposite direction, respectively.
Figure 1B:
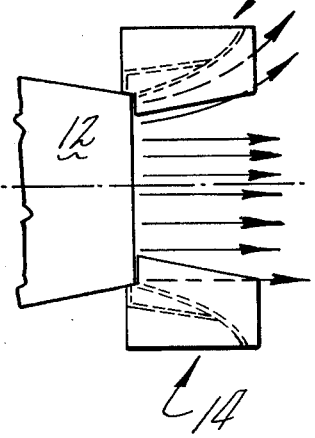
Figure 1C:
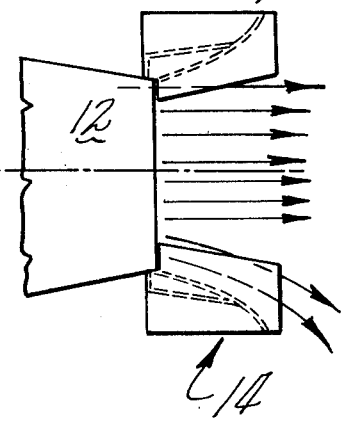

With reference to FIGS. 1a, 1b and 1c, the general functioning of the flow attachment devices is illustrated. In FIG. 1a, the exhaust stream emanating from the tailpipe remains unaffected by either of the flow attachment devices 14 and 16, whereby the entire stream is directed rearwardly along the longitudinal axis of the nozzle, as defined by the tailpipe 12. When attachment device 16 is rendered active (as shown in FIG. 1b) by means discussed hereinafter, an annular sector of exhaust flow is deflected to thereby produce a lateral force. Similarly, when attachment device 14 is activated (as shown in FIG. 1c), an opposite annular sector of exhaust flow is deflected to produce a lateral control force in the opposite direction.

Figure 2:
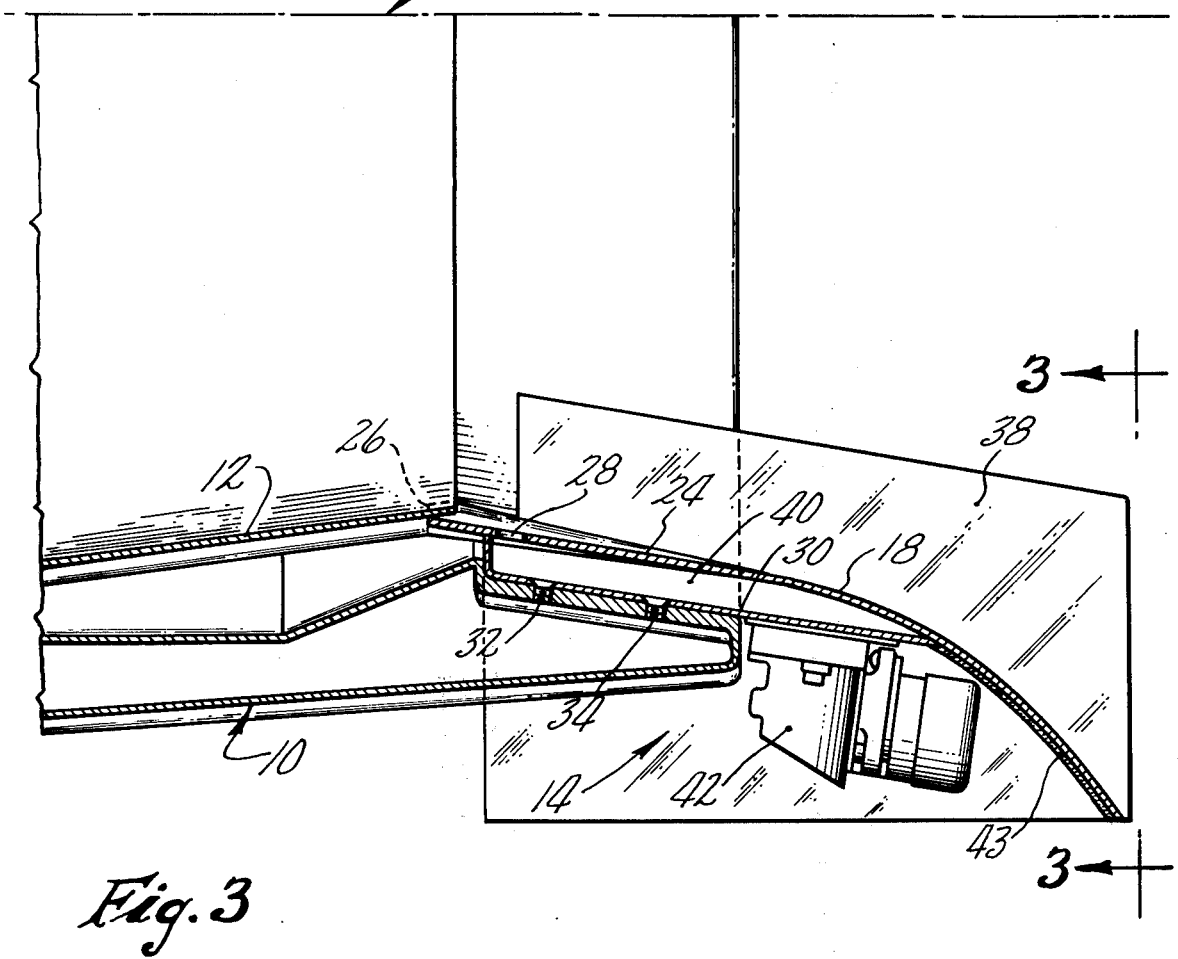
FIG. 2 is a sectional view of a thrust control device of FIG. 1, taken along the line 2—2 of FIG. 1.
Figure 3:
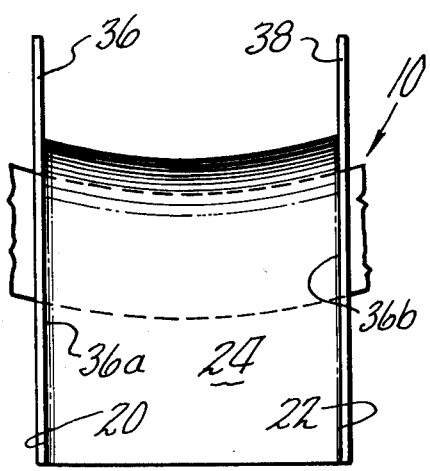
FIG. 3 is a fragmentary rear elevational view of the thrust control device of FIG. 2, taken along the line 3—3 thereof.

Turning now to FIG. 2, with continued reference to FIG. 1, the structure of flow attachment device 14 and its relationship to the fuselage 10 and the tailpipe 12 may best be appreciated. Attachment device 14 includes a frame 18 with longitudinally extending sides 20 and 22 which are best shown in FIG. 3. The upper or inboard surface 24 constitutes an attachment surface to which the exhaust stream may adhere and thereby be deflected. It will be noted that the attachment surface 24 extends outwardly in a radial direction with respect to the longitudinal axis of the tailpipe 12 and rearwardly from the rear end of the tailpipe 12 in the direction of the longitudinal axis of the tailpipe. The attachment surface is shaped in such a manner that its distance from the longitudinal axis of the tailpipe 12 progressively increases in the rearward direction at a greater rate in the rear portion of the attachment surface than in the front portion of the attachment surface. In fact, the front portion of the attachment surface 24 has a constant slope while the slope of the rear portion progressively increases. The underlying rationale for having a curved rear portion is to facilitate flow detachment or separation, as is explained hereinafter. Also, the front portion of the attachment surface 24 is transversely concave to match the contour of the exterior wall of the tailpipe 12, as shown in FIGS. 2 and 3. This concavity, however, does not include the rear portion of the attachment surface 24.

As shown in FIG. 2, the front end or lip 26 of the attachment surface 24 lies outboard of the tailpipe 12 in abutting relationship to the outer wall thereof. This arrangement allows the attachment device 14 to accommodate expansions of a hot tailpipe without undue flexing of the frame.

Figure 4:
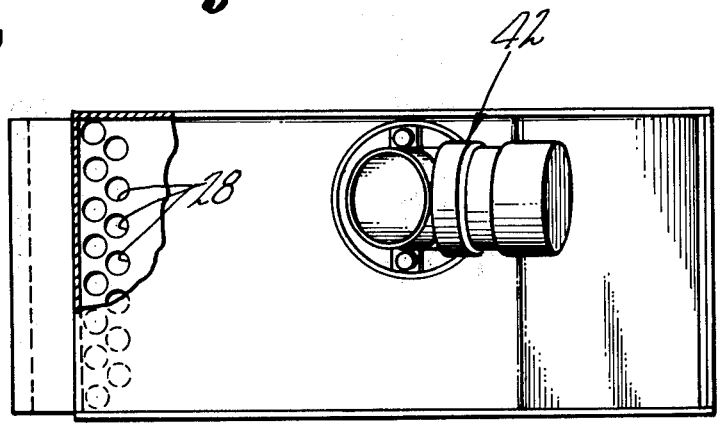
FIG. 4 is a bottom plan view of the thrust control device of FIG. 2.

Directing attention to FIGS. 1, 2 and 4, the front portion of the attachment surface 24 embodies a plurality of passages 28 in staggered relationship adjacent the front end 26 of the frame 18 through which the attachment surface 24 may communicate with ambient air so that an attached flow may be detached or switched. To the outboard side of the frame 18 is secured an L-shaped bottom plate 30, the lateral width of which is coextensive with that of the frame 18. The bottom plate 30 is mounted upon the fuselage 10 by suitable fasteners 32 and 34. A pair of longitudinally extending side plates 36 and 38 are mounted upon the respective sides of the frame 18 and the bottom plate 30 such that a chamber 40, communicating with the passages 28, is defined by the side plates 36 and 38, the inboard surface of the bottom plate 30, and the outboard surface of the frame 18.

A solenoid-operated, butterfly valve 42 is mounted upon the outboard surface of the bottom plate 30 for establishing and terminating fluid communication between the ambient atmosphere and the chamber 40. When valve 42 is opened, attached flow is detached; and when valve 42, is closed, flow is attached. Hence, a passage means is formed by the valve 42, chamber 40, and the passages 28 for admitting ambient pressure to the attachment surface 24. A layer of asbestos 43 is attached to the outboard side of the frame 18 to isolate the valve from the heat to which frame 18 is subjected.

The respective inboard surfaces 36a and 36b of the side plate 36 and 38, together with the attachment surface 24, define a flow channel which receives only an annular sector of the exhaust stream from the tailpipe 12. The side plates 36 and 38 project radially inwardly toward the axis of the tailpipe to define a flow channel with sufficient radial depth to permit ambient pressure at the attachment surface to detach the annular sector of flow attached thereto. In this regard, it should be noted that if the flow channel is too shallow, attached flow will not detach when valve 42 is opened. Furthermore, if the flow channel has too great a depth, flow will not attach to the attachment surface 24 when valve 42 is closed. Another factor which must be considered is the radius of curvature of the rear portion (curved portion) of the attachment surface 24. In this respect, too small a radius of curvature will not allow attachment and too large a radius of curvature will not allow detachment because of the influence of centrifugal force. Therefore, attachment and detachment characteristics are generally determined by the following factors, assuming a constant fluid density:

1. The velocity (V) of the exhaust stream;
2. the depth of the flow channel which determines the thickness ($t$) of the attached jet sheet; and
3. the radius of curvature (R) of the attachment surface.

The following equation may be utilized as a very rough guide where compressibility effects are neglected to determine the relationship between V, $t$ and R for thick jet sheets:

$$Ps - Pa = \rho \frac{V^2}{2} \cdot \frac{2t}{(R + t/2)} \cdot \left[ 1 + \frac{t}{2(R + t/2)} \right]$$

wherein:

$Ps$ is the pressure at the attached surface when the jet sheet is attached; (which may be assumed to be 4 psi);

$Pa$ is ambient or atmospheric pressure;

$\rho$ is the fluid density;

$V$ is the exhaust stream velocity;

$t$ is the thickness of the jet sheet which is assumed to be the height of the side plates above the attachment surface at the entrance to the flow channel; and $R$ is the radius of the attachment surface which is greater than t but of the same order.

Experimentation, however, will still be necessary to ascertain the exact relationship between V, $t$ and R which occasions satisfactory switching characteristics. For example, given V and $t$, it may be necessary to experimentally determine the magnitude of R where the annular flow sector can be readily switched between stable attached and detached positions. The University of Toronto Institute for Aerospace Studies Technical Note No. 78, April 1965, contains a discussion of this subject matter which may be helpful in understanding the problems associated therewith.

FIG. 5a schematically shows an embodiment of the invention where the exhaust flow may be switched to two attached positions, one of which could provide for thrust reversal and the other of which could provide for steering control. Exhaust flow from a tailpipe 12' flows over an attachment device 14', which is substantially identical in structure and mounting to previously described attachment device 14, save for the provision of an additional set of passages 28" in the rear portion of the attachment surface and valve 42". Bottom plates (not shown) are omitted from this view for the sake of clarity. With valves 42' and 42" both closed, the attached flow will be directed toward a thrust reversal deflector 44, which is shown turning the flow from the attachment surface 24' back toward the tailpipe. If desired, thrust reversal deflector 44 could be positioned to direct the attached flow back into the exhaust stream. When valve 42' is open, there is, of course, no attachment, irrespective of whether valve 42" is open. When only valve 42' is closed, attached flow separates from the rear portion of the attachment surface and passes above the deflector 44, whereby a lateral thrust is occasioned.

FIG. 5b shows a further embodiment of the invention in which an annular sector of a nozzle exhaust stream may be deflected to furnish a thrust vector component for vehicle deceleration. Exhaust flow from a tailpipe 12" flows over an attachment device 14", having an attachment surface 24", when a control valve 42" is closed in the manner described with reference to FIGS. 2–4. A deflector 44' serves to turn the attached flow back into the exhaust stream, whereby a reverse thrust component is generated. The lower end of deflector 44' may be slightly spaced from the rear end of the frame to produce a boundary layer discontinuity, if necessary. It should be evident that at least two attachment devices as shown in either FIG. 5a of FIG. 5b would normally be utilized for vehicle control and/or deceleration. This, however, would not be necessary in all cases.

It should be evident that the flow attachment devices 14 and 16 could be operated in a variety of ways to furnish satisfactory yaw control. For example, the valves could be pulsed open and closed, utilizing frequency or pulse width modulation, or maintained open for a predetermined period of time, either automatically or manually.

Figure 6:
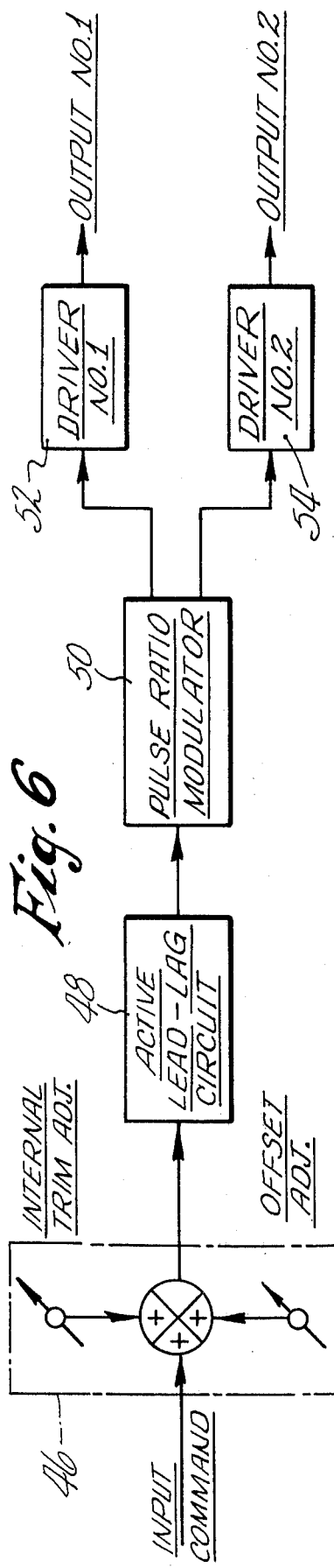
FIG. 6 is a block diagram of a preferred method for operating the valves of the thrust control devices of FIG. 1.

However, a preferred method of operating the valves is depicted in block form in FIG. 6. With reference thereto, a summing junction 46 receives an input command signal voltage and two adjustment voltages. The sum of these signals is applied to a lead-lag circuit 48. The output signal of the lead-lag circuit 48 is directed to a pulse-ratio modulator 50 which converts this output signal into a pulse train having constant pulse amplitude. The pulse width (duration) and the pulse frequency are both varied by the modulator 50 in such a way that the ratio of the pulse on time to the total time is linearly proportional to the magnitude of the dc input signal. This technique is known in the art and is discussed in Volume 34, "IRE Transactions On Instrumentation," at pages 34–47. Depending upon whether the command signal is on one side or the other of a predetermined datum voltage (e.g., 2.75 volts), a pulse train is either applied to the driver 52 for the solenoid of valve 42 or the driver 54 of the solenoid of the valve (not shown) of flow attachment device 16, such application being effected in a mutually exclusive manner. The drivers, of course, cause current to flow through the respective solenoid coils when they receive pulses.

A preferred circuit for implementing the block diagram of FIG. 6 is shown in FIG. 7. A command input voltage is applied to an input circuit 56 which includes an input resistor $R_1$. Offset potentiometer adjustments, respectively comprised of $R_2$, $R_3$, and $R_4$ $R_5$, permit establishment of a desired reference null voltage at the input.

If desired, the lead-lag circuit 48 may be furnished for compensating the output of the input circuit so as to improve response characteristics and the margin of stability. The lead-lag circuit 48 is conventional and is constituted by an amplifier $A_1$ having resistances $R_6$, $R_7$ and $R_8$ in the feedback loop with a grounded capacitor $C_1$ connected between $R_7$ and $R_6$. This circuit provides closed loop stabilty.

Pulse ratio modulator 50 is composed of seven elements, viz:

a summing integrator 56;
a non-inverting feedback amplifier 58;
a feedback limiter 60;
a first latch with hysteresis 62;
a second latch with hysteresis 64;
a first switch 66; and
a second switch 68.

A brief description of each of the above-enumerated elements follows.

The summing integrator 56 includes an amplifier $A_2$ having a capacitor $C_2$ in the feedback path thereof. The integrator 56 also has four input resistances connected in parallel $R_9$, $R_{10}$, $R_{11}$ and $R_{12}$. $R_9$ receives the output of the lead-lag circuit 48 while $R_{10}$ and $R_{12}$ are connected to the switches 66 and 68, respectively, which are both turned off by the latches 62 and 64 when a null condition is attained. Input resistance $R_{11}$ receives a feedback signal from the non-inverting feedback amplifier 58 via the feedback limiter 60.

Feedback from the summing integrator 56 is directed to the non-inverting feedback amplifier 58, which comprises an amplifier $A_3$ with respective feedback and input resistances $R_{13}$ and $R_{14}$ connected to an input terminal thereof, resistance $R_{14}$ being connected to a voltage source and resistance $R_{13}$ being connected to the amplifier output. The feedback amplifier 58 achieves amplification without phase inversion, whereby a negative feedback signal is applied to resistance $R_{11}$.

The output signal from the non-inverting feedback amplifier 58 is received by the feedback limiter 60 which is constituted by a ratio or potentiometric circuit of resistances $R_{15}$ and $R_{16}$, the latter of which is connected to a voltage source and the former of which is connected to the output of the amplifier $A_3$. The feedback limiter 60 functions to reduce the output level of the amplifier $A_3$ for limiting the voltage level which corresponds to the amplifier saturation voltage. Hence, the feedback voltage to $R_{11}$ is limited to a small percentage of the amplifier saturation voltage.

The first latch 62 is embodied by an amplifier $A_4$ having a feedback resistor $R_{17}$ for providing hysteresis connected to the positive terminal thereof. An input resistance $R_{18}$ is connected with a source of potential and a resistance $R_{19}$ grounded to a reference potential. The latch 62 generates only a high or low output voltage as determined by the signal level at the negative terminal of the amplifier $A_4$.

The second latch 64 is generally similar to the first latch 62 and comprises an amplifier $A_5$ and resistances $R_{20}$, $R_{21}$ and $R_{22}$. However, from FIGS. 7a and 7b, the relationships between the inputs to and the outputs of the respective latches may best be appreciated. It will be noted therefrom that at the null input voltage, the first latch 62 delivers a high output voltage whereas the second latch 64 delivers a low output voltage. In this state, neither of the operating valves is pulsed.

The on-off switch 66 is operated by the output voltage of the latch 62. When the latch 62 is tripped by the output of the integrator 56, a current flows through resistances $R_{23}$ and $R_{24}$, thereby producing a base current which switches on transistor $Q_1$. A negative feedback voltage is hence applied to $R_{10}$ which causes the voltage output of the integrator 56 slew downwardly toward a reduced voltage level or even reverse.

The second on-off switch 68, which directs its feedback signal to resistance $R_{12}$, operates in a manner similar to that of the switch 66. When the latch 64 is tripped, sufficient current flows through resistances $R_{25}$ and $R_{26}$ to engender a base current which turns on $Q_2$ whereby resistance $R_{12}$ communicates with a source of common potential.

The solenoid driver 52 comprises a drive amplifier $A_6$ having an input resistance $R_{27}$. The output of the amplifier $A_3$ is applied to a Darlington power transistor $Q_3$ via a resistance $R_{28}$ and a base drive Zener diode $D_1$. The collector of $Q_3$ is connected to the solenoid of the valve of the attachment device 14 which is also connected to a voltage source; and the emitter thereof is grounded. A Zener diode $D_2$ is incorporated in the driver 52 to prevent the imposition of large voltages across $Q_3$ when it is turned off and to facilitate current decay in the solenoid. Another diode $D_3$ connects ground to the output of the Zener diode $D_1$ to prevent the base of $Q_3$ from being exposed to large negative voltages thereacross which could possibly engender damage.

The driver 54 for the solenoid of the attachment device 16 is similar in construction to the driver previously described and comprises a drive amplifier $A_7$ having an input resistance $R_{29}$, a resistance $R_{30}$, diodes $D_4$, $D_5$ and $D_6$ and a Darlington transistor $Q_4$. It should be noted that the driver 52 energizes its solenoid when the latch 62 generates a low voltage and conversely, that the driver 54 energizes its solenoid when the latch 64 produces a high voltage. Of course, at the null condition, the latches 62 and 64 respectively generate high and low voltages whereby the solenoids are inactive and the valves of the thrust control devices are open.

In operation, for small command input signal levels, the integrator 56 receives negative feedback through resistance $R_{11}$ and attains a steady state output as a first order lag which is not sufficient to trip either of the latches 62 and 64. Hence the valves of the thrust control devices 14 and 16 remain open with the flow unattached. For a larger command input signal, the feedback around the integrator 56 is limited so as to inhibit the lag effect and cause the output of the integrator to slew at a rate proportional to the applied error signal. When the integrator output slews up or down to the on trip level of one of the latches 62 and 64, one of the valves will close and flow will attach to the attachment surface thereof, thereby generating a lateral control force.

The activated latch, in turn, turns on its switch which supplies the integrator 56 with a substantially constant negative feedback. This action results in a reverse or down slewing of the integrator output which continues until the off trip level of the activated latch is attained, the trip on and off levels being different because of the hysteresis beget by the feedback around the latch. With the off trip level of the latch attained, the associated switch is turned off to thereby terminate the negative feedback at either resistance $R_{10}$ or $R_{12}$. Elimination of such negative feedback permits the integrator output to again slew up until the latch trip level is again achieved. Hence, one of the solenoids will continuously be pulsed on and off for an input command signal sufficient to activate a latch. Therefore, only one of the solenoids may be repetitively energized and deenergized or both solenoids may be deenergized.

As the command input signal is increased or decreased to either side of a reference datum level, the integrator slew rate increases so that the off period of the solenoid is shortened. It should be noted however that up to about half of maximum command input, the down slew rate is controlled primarily by the negative feedback from one of the latches 62 and 64. Therefore, in this range the solenoid on time exhibits a small variation, although the frequency of the integrator output signal increases rapidly due to the initially increased rate of up slew. When the command input signal further increases, the influence of the negative feedback from the latch decreases, thereby decreasing the down slew rate and increasing the time on period of the selected solenoid. Although the up slew rate increases, the down slew rate is decreased so as to reduce the frequency.

Figure 8:
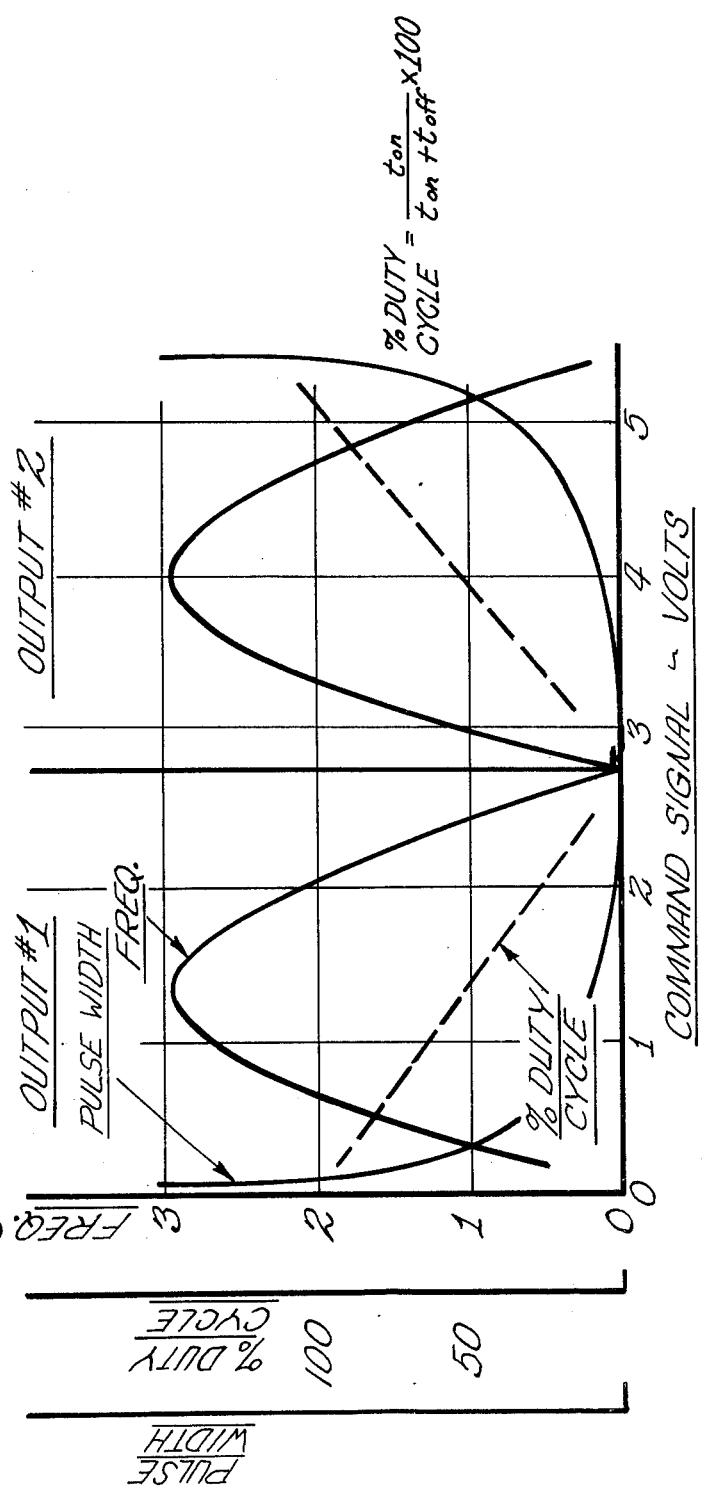
FIG. 8 is a graph showing the control pulse frequency, pulse width and duty cycle for a given input command signal.

The variations of pulse frequency, pulse width and duty cycle (which is also termed duty ratio) with command signal input are shown in the graph of FIG. 8. As the command input signal increases from a null point (depicted as $2.75^v$) in either direction the pulse width may be seen to increase slowly for small command input signals, while the pulse frequency increases rapidly. As the command signal is either increased toward zero from the midpoint of $1.5^v$ or increased toward $6^v$ from the midpoint of $4^v$, it will be noted that the frequency rapidly decreases while the pulse width rapidly increases. It will also be noted that the duty cycle varies linearly with command input signal.

Obviously, many modifications and variations are possible in light of the above teachings which lie within the scope of the appended claims. For example, the flow attachment devices could be employed to furnish lateral control for a boat having a nozzle which emits water, the type of fluid utilized being only a matter of design choice. Also, it will be appreciated that controls for attachment devices need not constitute electric circuits but could also be fluidic or mechanical. The type of control selected will primarily depend upon the nature of the device to which the invention is applied. Furthermore, the illustrated chamber arrangement could be replaced by suitable conduits or eliminated by direct attachment of the valve to the frame. Also, it should be noted that a device according to the invention can utilize either subsonic or supersonic flow.

We claim:

1. A thrust vector control system for generating control forces comprising:
   an exhaust nozzle for directing an exhaust stream rearwardly along its longitudinal axis;
   means to produce a flow through the exhaust nozzle;
   a frame with longitudinally extending sides having an attachment surface defined between the sides thereof, mounted upon the nozzle such that the attachment surface extends outwardly in a radial direction with respect to the longitudinal axis of the nozzle and rearwardly from the rear end of the nozzle in the direction of the longitudinal axis of the nozzle, a front portion of the attachment surface being adjacent the rear end of the nozzle wall so that an exhaust stream emanating therefrom may attach to the attachment surface;
   a pair of longitudinally extending side plates mounted upon the sides of the frame projecting radially inwardly toward the longitudinal axis of the nozzle such that a flow channel is defined by the inboard surfaces of the side plates and the attachment surface, the flow channel being positioned to receive only an annular sector of the exhaust stream when the exhaust stream is attached to the attachment surface and when the exhaust stream is detached from the attachment surface and the flow channel being of sufficient radial depth to permit ambient pressure at the attachment surface to detach the exhaust stream therefrom; and
   passage forming means for establishing and terminating fluid communication between the attachment surface and the ambient atmosphere so that the annular exhaust stream sector may be respectively separated from or attached to the attachment surface.

2. The control system of claim 1, wherein the attachment surface is shaped such that its distance from the longitudinal axis of the nozzle progressively increases in the rearward direction at a greater rate in the rear portion of the attachment surface than in the front portion of the attachment surface.

3. The control system of claim 1, wherein the passage forming means comprises:
   at least one passage extending through the frame such that it communicates with the front portion of the attachment surface at a location adjacent the rear end of the nozzle.

4. The control system of claim 3, wherein the passage forming means further comprises:
   a bottom plate mounted on the outboard side of the frame such that a chamber communication with the passage is defined by a surface of the bottom plate, the outboard surface of the frame, and the side plates; and
   a valve connected to the bottom plate for establishing and terminating fluid communication between the ambient atmosphere and the chamber.

5. The control system of claim 4, further comprising:
   means to repetitively open and close the valve in response to a command signal.

6. The control system of claim 1, further including:
   a deflector positioned at the downstream end of the frame for turning the annular exhaust stream sector which is attached to the attachment surface such that a reverse thrust is generated.

* * * * *